Figure 1:
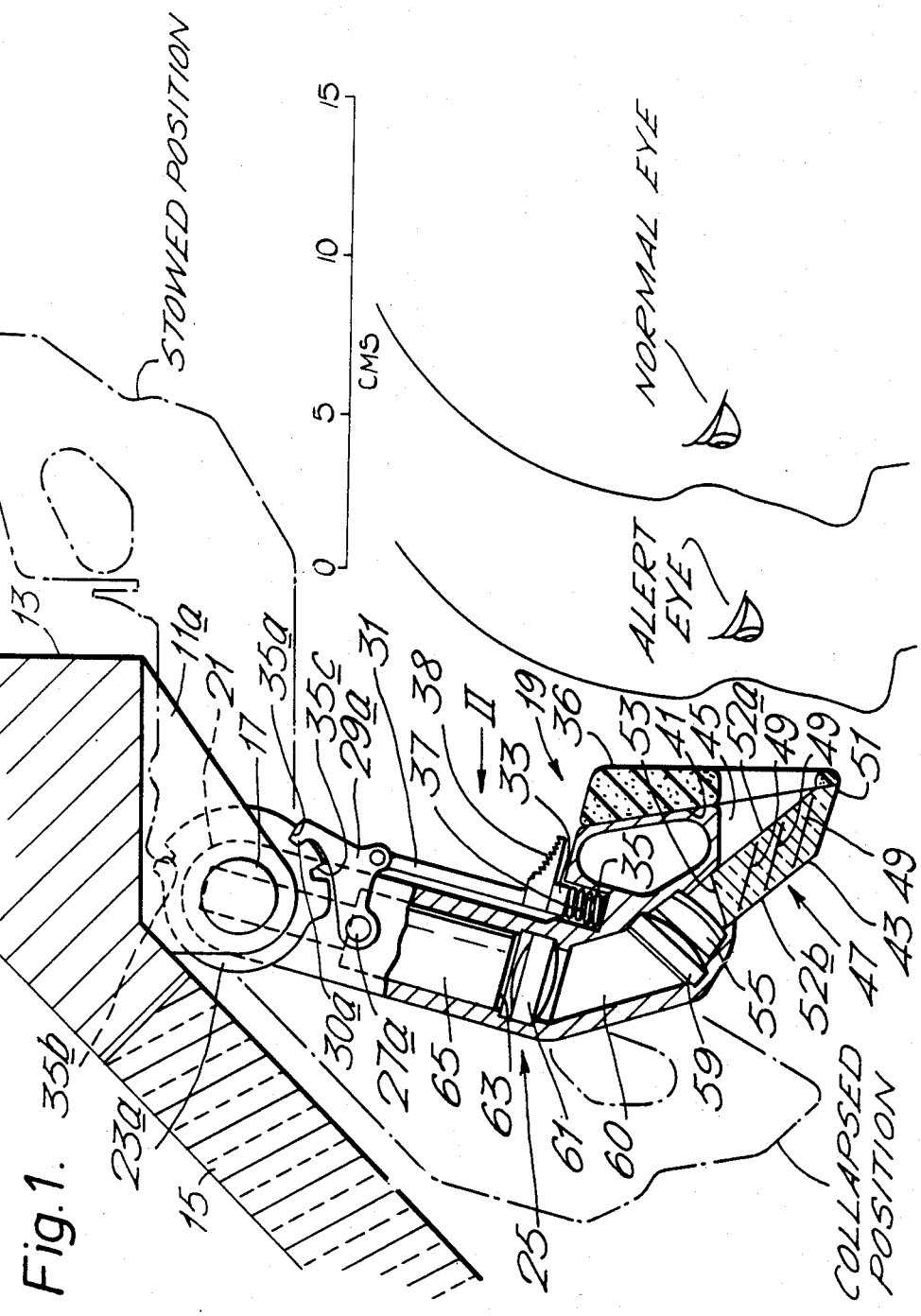

United States Patent [19]

Ellis

[11] 4,188,090

[45] Feb. 12, 1980

[54] RETRACTABLE HEAD-UP DISPLAYS

[75] Inventor: Stafford M. Ellis, East Preston, England

[73] Assignee: Elliott Brothers (London) Limited, Chelsmsford, England

[21] Appl. No.: 909,831

[22] Filed: May 26, 1978

[30] Foreign Application Priority Data

Jun. 1, 1977 [GB] United Kingdom ............... 23101/77
Jun. 21, 1977 [GB] United Kingdom ............... 25809/77
Apr. 4, 1978 [GB] United Kingdom ............... 13143/78

[51] Int. Cl.² ............................................ G02B 27/10
[52] U.S. Cl. ........................................................ 350/174
[58] Field of Search ........................................ 350/174

[56] References Cited

U.S. PATENT DOCUMENTS

| 3,170,979 | 2/1965 | Baldwin et al. | 350/174 |
| 3,503,146 | 3/1970 | Woplin | 350/174 |
| 3,549,803 | 12/1970 | Becht et al. | 350/174 |
| 3,614,314 | 10/1971 | Rossire | 350/174 |
| 3,787,109 | 1/1974 | Vizenor | 350/174 |
| 3,816,005 | 6/1974 | Kirschner | 350/174 |
| 4,082,432 | 4/1978 | Kirschner | 350/174 |
| 4,099,841 | 7/1978 | Ellis | 350/174 |

OTHER PUBLICATIONS

Yoder; Paul R., *Spie Journal*, vol. 9, No. 1, Oct.–Nov. 1970, pp. 5-9.

*Primary Examiner*—Jon W. Henry
*Attorney, Agent, or Firm*—Kirschstein, Kirschstein, Ottinger & Cobrin

[57] ABSTRACT

An aircraft head-up display head of the kind incorporating an image combiner through which an observer can view a distant scene, and from which optical images developed and projected by an optical projector are reflected to the observer, wherein the combiner is supported from a light obstructive member, e.g. the projector housing, which intrudes within the observer's field of view of the distant scene, but is sufficiently narrow not to obstruct the observer's field of view.

3 Claims, 16 Drawing Figures

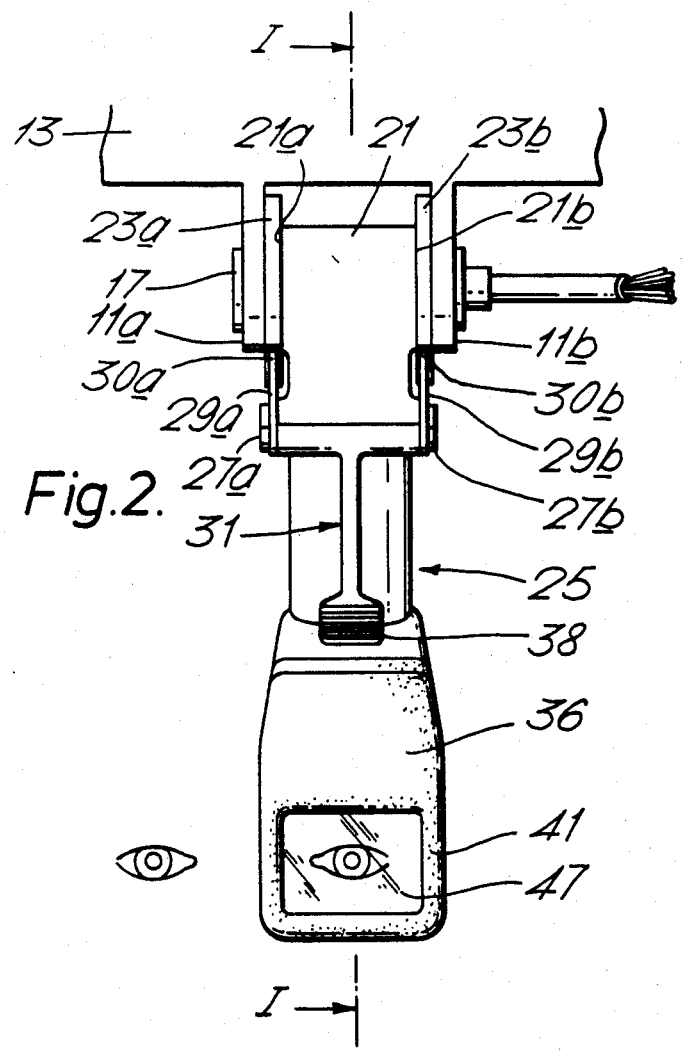

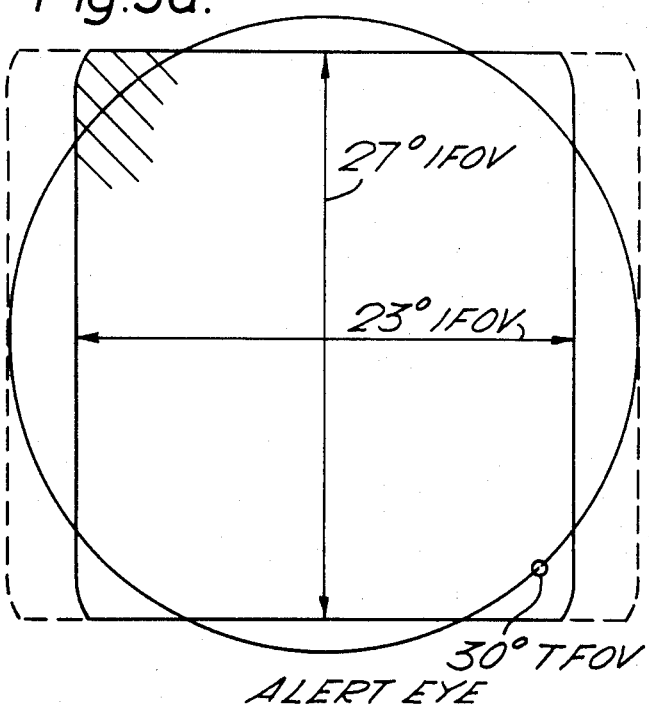
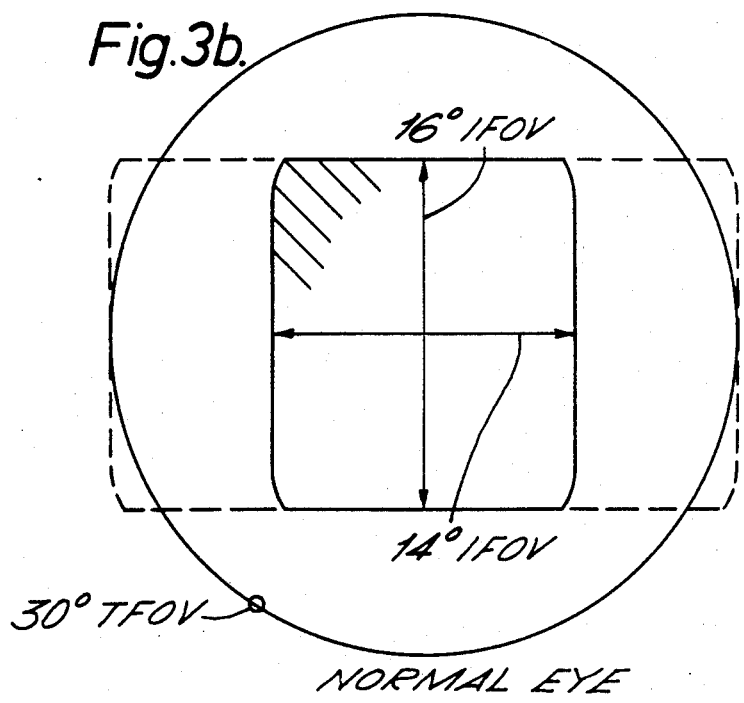

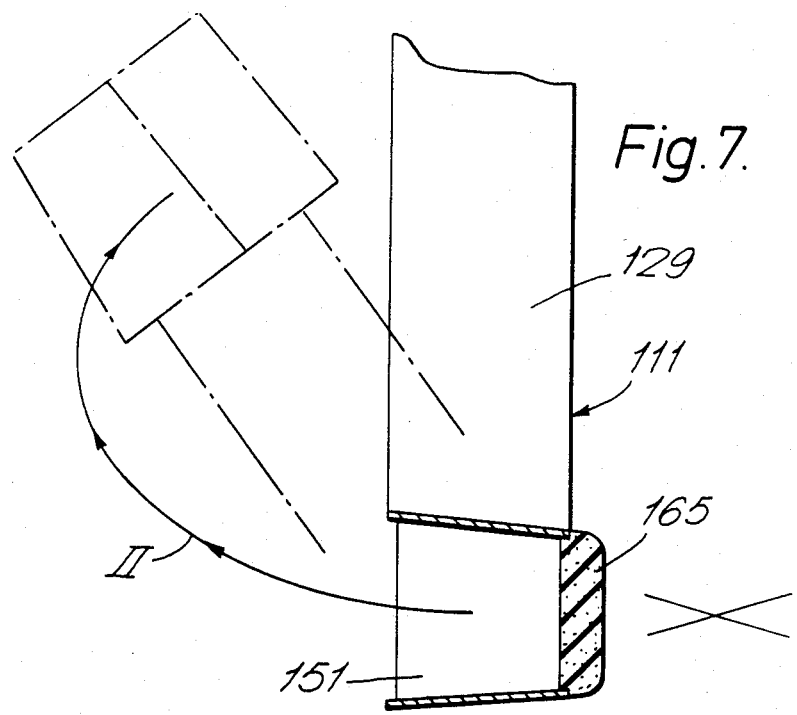
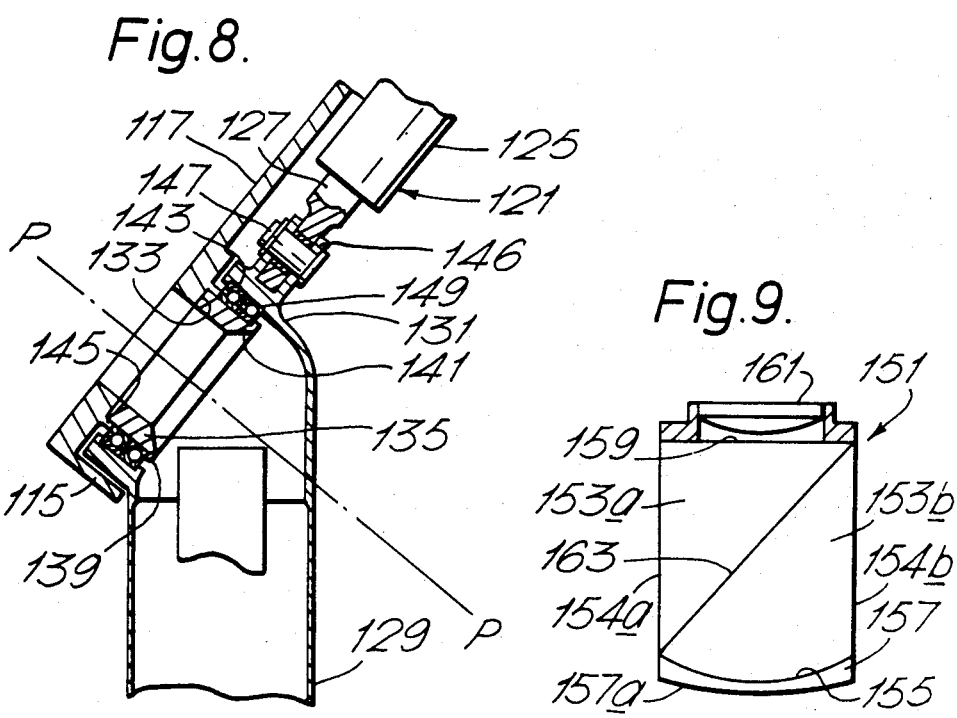

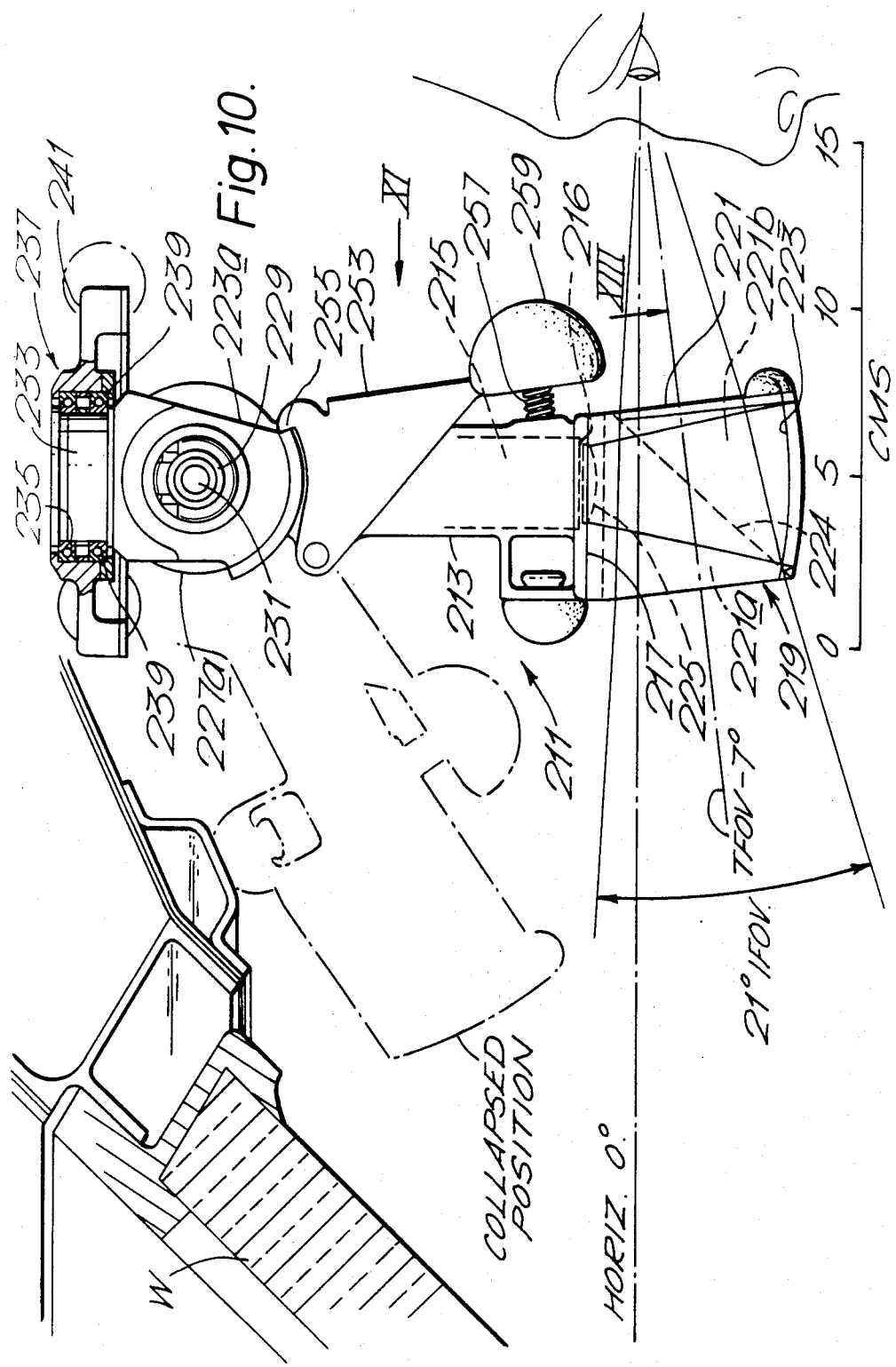

RETRACTABLE HEAD-UP DISPLAYS

This invention relates to display heads for aircraft head-up display systems.

A display head for an aircraft head-up display system (hereinafter referred to as "a display head of the kind described") comprises an optical projector and an image combiner through which an observer, generally the pilot of the aircraft, can view a distant scene and from which collimated optical images developed by and projected from the optical projector are reflected to the observer. The optical images appear to the observer as virtual images "at infinity," and being, as it were, superimposed on the distant scene, such images can be viewed by the observer without demand for ocular accommodation.

The value of head-up display systems in military aircraft has been fully demonstrated. More recently civil aircraft operators have evinced an interest in the introduction of head-up display systems in civil transport aircraft, recognizing that the introduction of the head-up display in such aircraft would create opportunities for pilot safe intervention in the control of aircraft below normal Category 3A decision height, i.e. 50 feet, during automatic landings of the aircraft.

It is an object of the present invention to provide a display head of the kind described which is suitable for use in a civil transport aircraft.

According to the present invention, in a display head of the kind described the image combiner is supported from a light obstructive member which intrudes within the observer's field of view of the distant scene in use of the display head, but no intruding part of said member has a width greater than a prescribed interpupillary distance so that notwithstanding the intrusion of said member there is no obstruction by said member of the observer's view of the distant scene.

A display head in accordance with the invention will normally be arranged for monocular use by the observer.

The prescribed interpupillary distance will of course normally be the likely minimum distance between the pupils of observers using the display head.

Normally said member will comprise a housing for the optical projector of the display head.

Preferably the display head is displaceable between an operational position in which the display head is at a position intercepting the observer's line-of-sight to the distant scene and a stowed position at which the display head is at a position at which it does not intrude into the observer's field of view of the distant scene.

Preferably the display head is, in the operational position, dependent from a position above the observer's head.

In one particular embodiment the display head is rotatable about a single axis such that, in moving the display head from the operational position to the stowed position, the initial movement of the display head has a major component parallel to the observer's line-of-sight to the distant scene, and the terminal movement of the display head has a major component in a direction at right angles to said line of sight towards the stowed position.

In one such embodiment said single axis is an overhead transverse axis fixed in the aircraft; there is a releasible latch member operable to retain the display head in either the operational position or in the stowed position; the latch member is biassed by a spring; and in the event of contact between the observer's head and the housing, the latch member moves, against the spring bias, so as to permit rotation of the display unit, thereby reducing the risk of physical injury to the observer.

In an alternative embodiment said single axis is inclined with respect to the aircraft orthagonal axes at such an angle, and the display head is so shaped, that said terminal movement has a major component to the left or right of said line-of-sight.

In such an embodiment the display head is suitably connected to a member possessing compliance and the display head is pivotal about said single axis, through the overcentre position of the compliant member, between the operational and the stowed positions. The display head is movable through the overcentre position of the compliant member not only by manual pressure but also as a result of accidental contact with the observer's head.

Three embodiments of the invention are hereinafter described with reference to the accompanying drawings in which FIGS. 1, 2, 3a and 3b relate to the first embodiment.

FIG. 1 showing, to the scale indicated a geometrically and dimensionally true sectional elevation of a display unit, taken on the line I—I of FIG. 2;

FIG. 2 shows to the same scale an elevation of the display unit as viewed in the direction of the arrow II in FIG. 1; and FIG. 3a and 3b illustrating the instantaneous and total fields of view of an observer using the unit and with one eye only positioned at the alert eye and normal eye positions, respectively;

FIGS. 4 to 9 relate to the second embodiment

Figure 4:
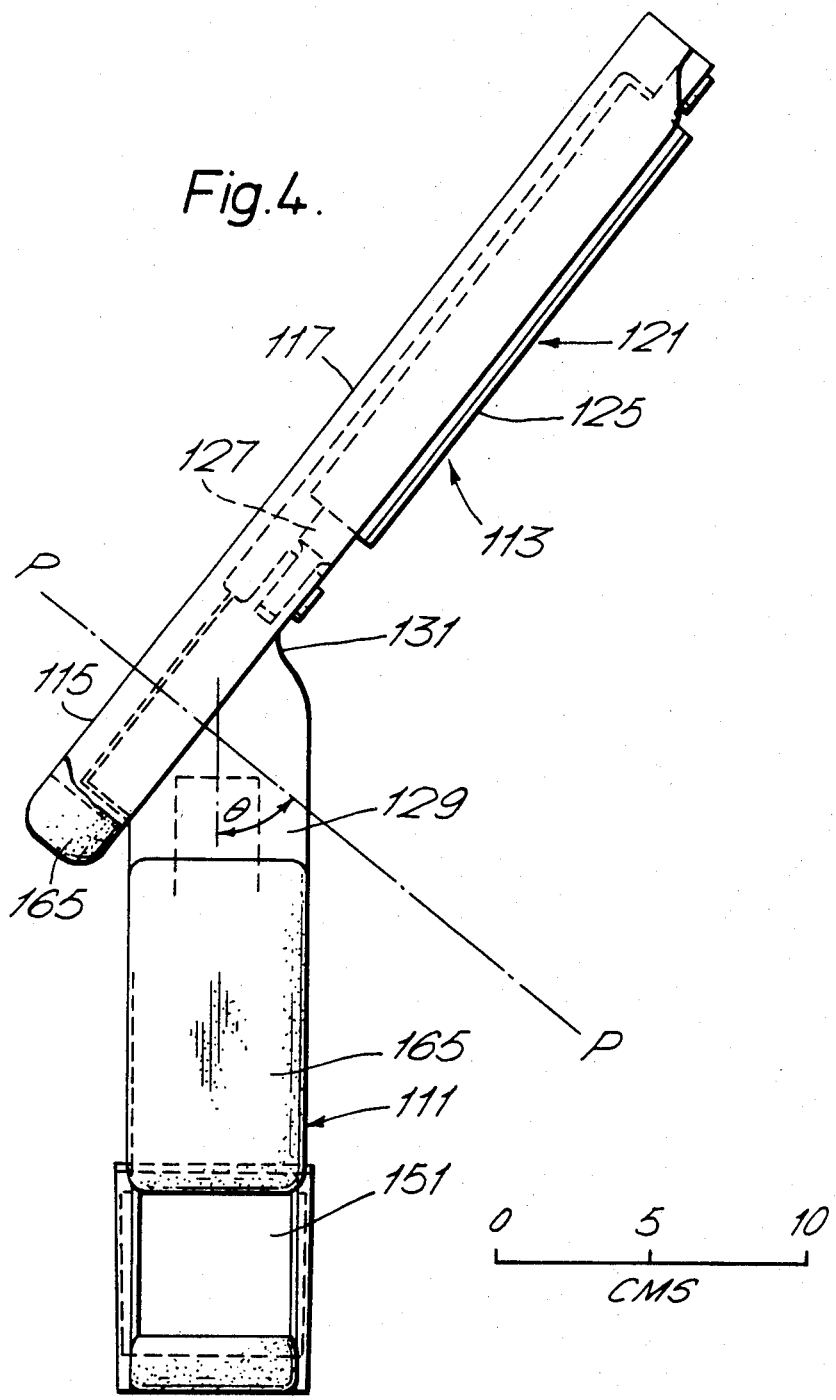
Figure 5:
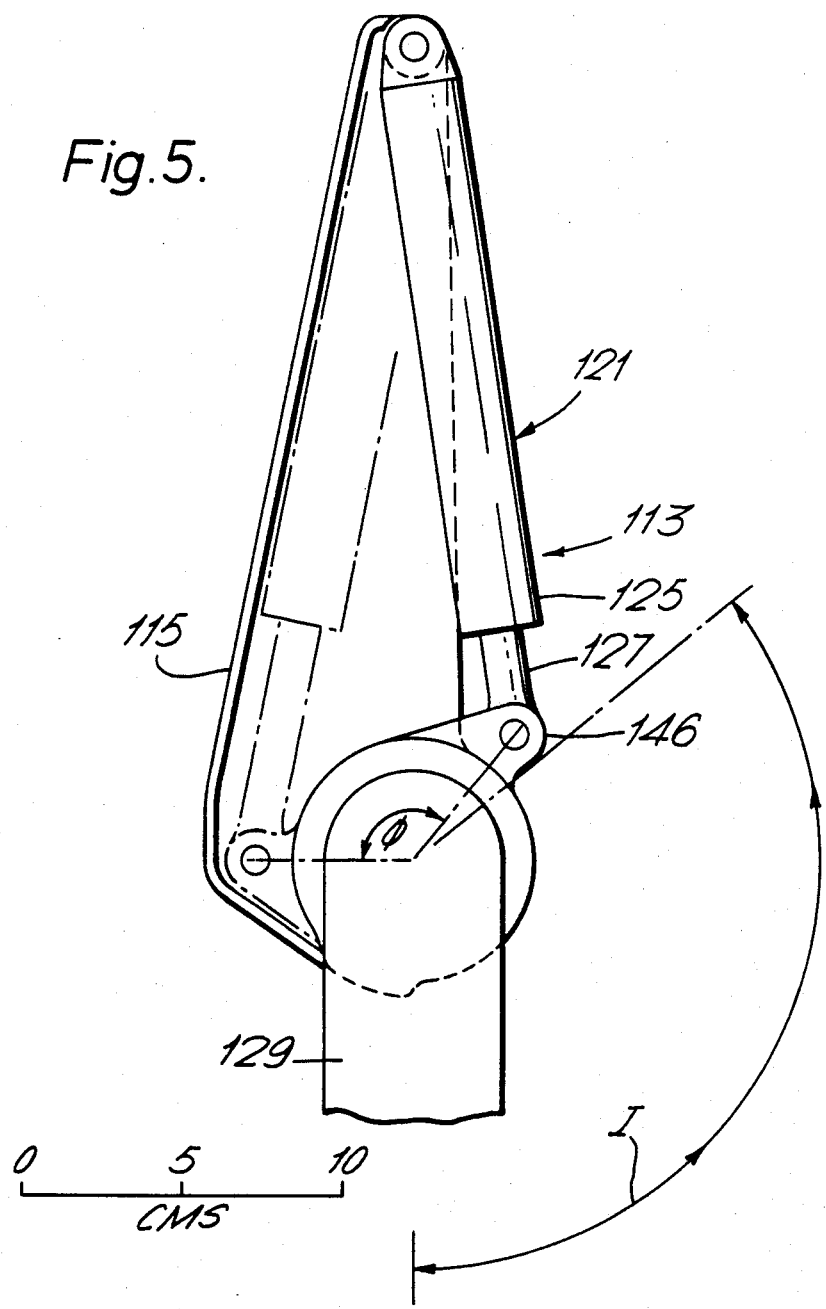
Figure 6:
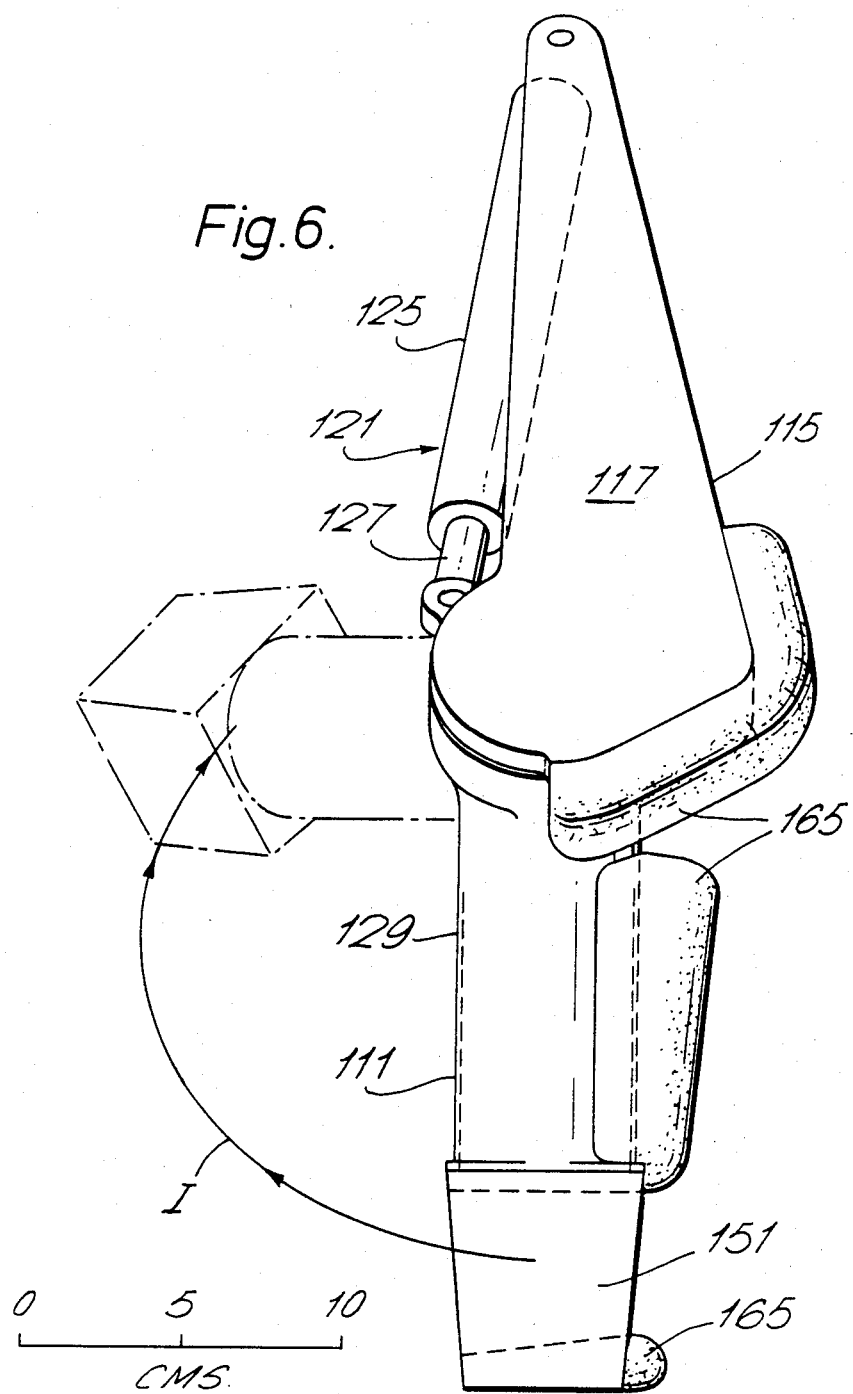

FIG. 4 showing to the scale indicated a frontal elevation of the display head;

FIG. 5 showing in plan, the underside of a mounting arrangement;

FIG. 6 showing a side view with the display head in the operational (full line) and stowed (chain dotted line) positions;

FIG. 7 showing a plan view with the display head in the operational and stowed positions;

FIG. 8 showing a detail of the assembly; and,

FIG. 9 showing a combiner; and

FIGS. 10 to 14 relate to the third embodiment

Figure 11:
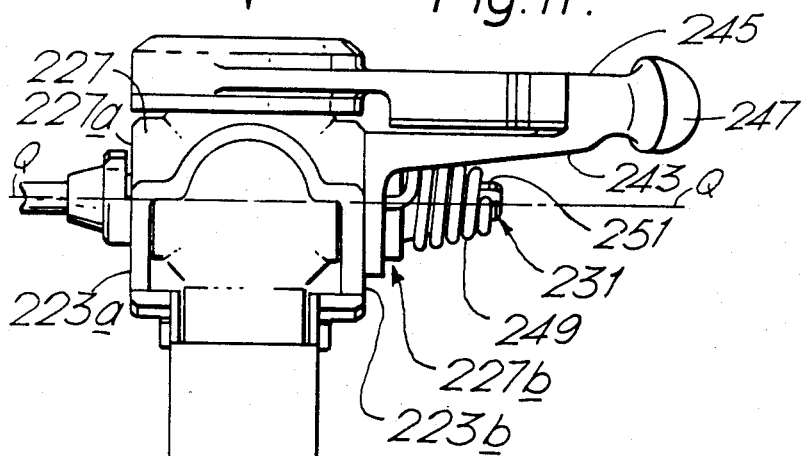
Figure 12:
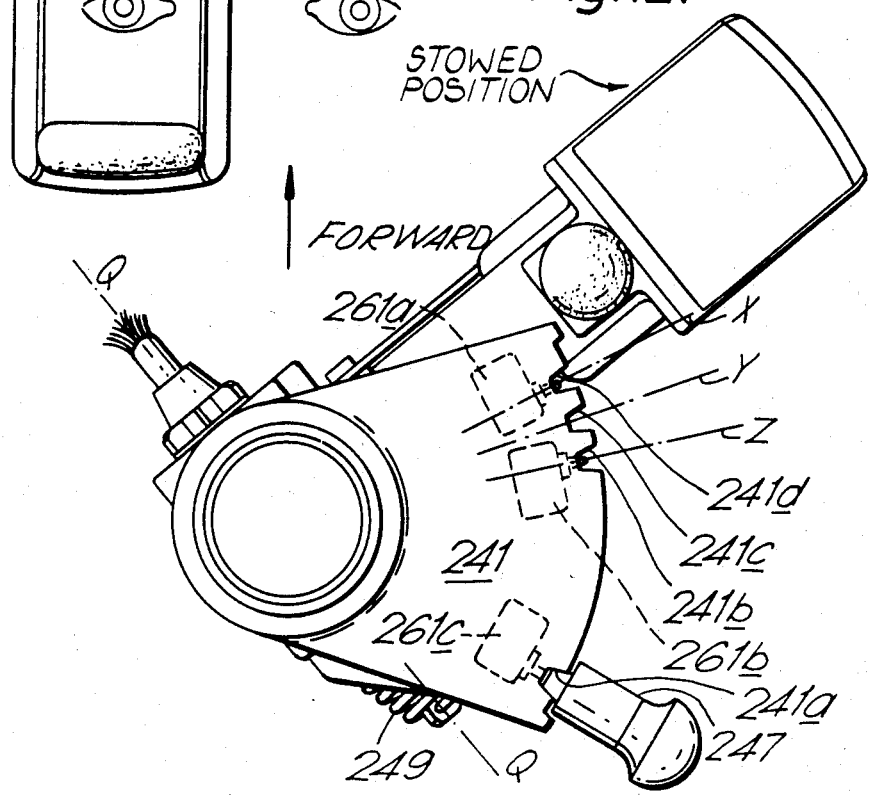
Figure 13:
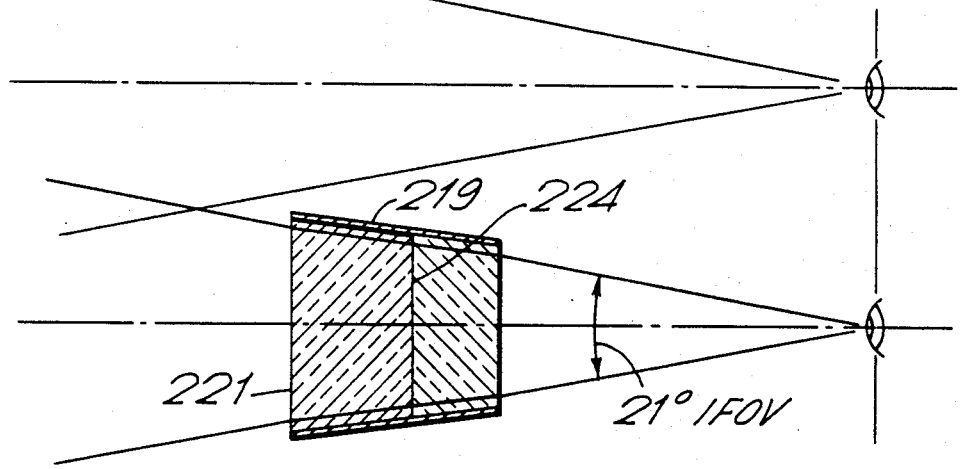

FIG. 10 being a diagrammatic side elevation, to the scale shown, of the third embodiment;

FIG. 11 showing diagrammatically an elevation in the direction XI in FIG. 1;

FIG. 12 showing diagrammatically a plan view in the direction XII in FIG. 11;

FIG. 13 showing a section in direction XIII in FIG. 10; and

Figure 14:
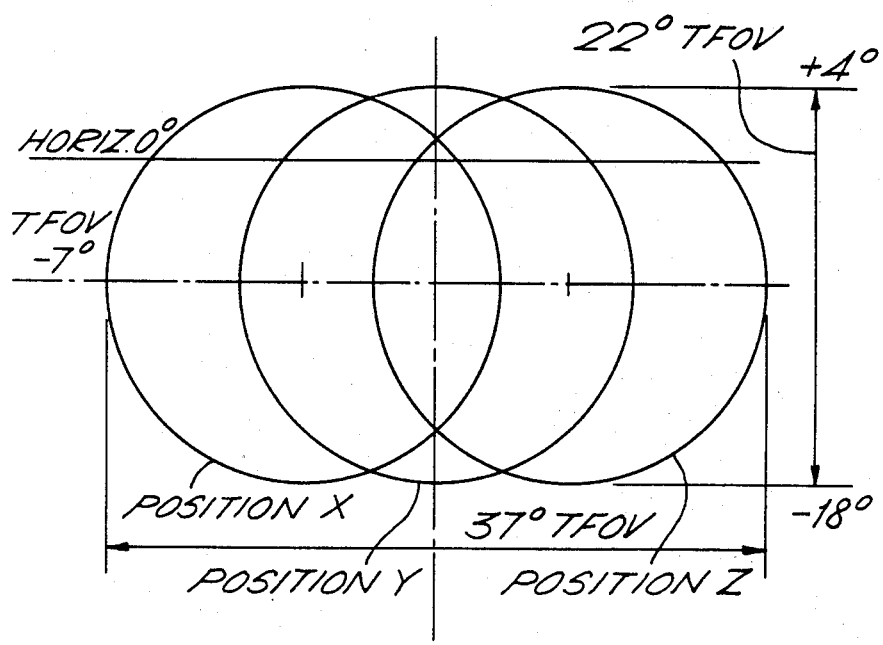

FIG. 14 showing the instantaneous and total fields of view achievable with the unit of FIGS. 11 to 13.

In the first embodiment (FIGS. 1, 2, 3a and 3b) two flanges 11a and 11b are dependent from an overhead frame member 13 adjacent to the aircraft windshield 15. Extending between the flanges, 11a, 11b, there is a pivot pin 17.

The display head 19 has a cylindrical boss 21. Between the end surfaces 21a and 21b of the boss 21 and the flanges, 11a, 11b, there are two toothed members 23a and 23b respectively. These are secured to the inner faces of the flanges 11a, 11b.

The display head 19 has a tubular housing 25. At diametrically opposed lateral positions thereon there are secured two pivots 27a, 27b, on which are carried two latch members 29a, 29b, respectively.

The latch members 29a, 29b, have pivotal connections with a generally T-shaped spring-bias transmission member 31, the free end 33 of which extends into a pocket 35 of the display head and contacts a bias spring 37 therein.

As may be seen the toothed members, 23a, 23b, each have three notches 35a, 35b, 35c; and the latch members 29a, 29b, each have a pawl 30a, 30b, adapted to enter the notches 35a, 35b, 35c.

The bias transmission member 31 has a serrated step 38. Manual movement of the transmission member 31 against the bias of the spring 37 has the effect of disengaging the pawls 30a, 30b, from the notches in which they happen to be located so as to permit the display head to be rotated counter clockwise, as viewed in FIG. 1, until under the bias of the spring 37, the pawls 30a, 30b enter the notches 35b. The unit is then in a stowed position away from the field of view of the observer, as indicated in FIG. 1.

A collapsed position defined by notches 35c in members 23a, 23b which the unit may assume as a result of clockwise rotation, as viewed in FIG. 1, of the head, as a result of contact between the observer's head and the head housing is further indicated in FIG. 1. The engagement between the pawls 30a, 30b and the notches 35a in members 23a, 23b, whilst serving to maintain the operational position, is nevertheless such that undue contact with the housing is sufficient to cause the pawls to ride out of the notches 35a against the bias of the spring 37. To further reduce the risk of injury to the observer the housing 25 has an impact absorbing part 36.

The major portion of the housing 25 is circular cylindrical but the end portion remote from the boss 21 has a substantially flat rear face 41 and a substantially flat forward face portion 43. The faces 41 and 43 are apertured to provide between them a generally rectangular passage 45 through which the observer can view the distant scene.

Located in the rectangular passage 45 there is a combiner element 47 which may take a variety of forms, but as shown in FIG. 1 consists of a multi-film combiner element of the kind described in the specification of U.S. patent application Ser. No. 807,920 filed on June 20, 1977 in the name Stafford Malcolm Ellis now U.S. Pat. No. 4,099,841.

Briefly stated the multi-film combiner 47 comprises a plurality of cemented together glass or other transparent refractive material elements at the interfaces of which there are three semi-reflective films 49. At one end surface 51 of the combiner element 47 there is a fully reflective coating. Optical data light images from an optical projector enter the element 47 via the other end surface 53, as further described below, for reflection to the observer at the films 49 and the coating on surface 51.

The films 49 are flat and parallel to one another and to the surface 51. The rearwards and forwards facing surfaces 52a, 52b of the combiner element are flat and parallel. The angle between the films 49 and the surface 52a is equal to the angle which the films 49 subtend with respect to the surface 53. It is a virtue of a multi-film combiner that because of the large field of view easily obtainable in pitch and in azimuth even relatively large movements of the observer's head with respect to the combiner do not prevent its effective use; the collimated projected optical data is still within the total field of view.

For a full understanding of the construction of such a combiner element reference should be made to the specification of the above-mentioned application.

In the optical projector an exit lens 55 is truncated, or cropped, so as to define a substantially rectangular exit aperture the major dimension of which is parallel to the direction of width of the combiner 47, i.e. in the direction perpendicular to the plane of FIG. 1.

The exit lens 55 together with further lenses 59 and 61 and a prism 60 form a collimating optical subsystem in the projector whereby optical data presented at the screen 63 of a cathode ray tube 65 are projected collimated for reflection at the several reflective surfaces 49, 51 of the multi-combiner 47 to the observer viewing the distant scene through the rectangular passage 45.

In order that the display head does not obstruct any part of the distant scene, the display head is constructed and designed so that no light obstructive part of the display head within the observer's field of view of the distant scene has a transverse dimension greater than the interpupillary distance of the observer's eyes. A suitable value for the maximum transverse dimension is 6.25 cms.

The display head is, it will be understood, used monocularly by either eye. There is no obstruction due to the presence of the display head because every point of the distant scene is visible to at least one eye and most of the scene will be visible to both eyes.

The fields of view of the projected optical data obtainable using the display head shown in FIGS. 1 and 2, are given in FIGS. 3a and 3b. It will be seen that even with the head at the normal eye position a substantial instantaneous field of view (16°×30°) is obtained. A full azimuth total field of view (16°×30°) may be obtained by movement of the head 2.5 cms in each direction, as indicated by the dotted line.

With the head in the alert or operational eye position an instantaneous field of view 23° in azimuth and 27° in pitch is obtained; and the full 30° total field of view may be achieved by a mere 0.65 cm head movement in each direction as indicated by the dotted line, that is to say with substantially no head movement at all.

Whilst the combiner 47 is for preference a multi-film combiner it will be understood that a single film combiner could be used, such as is hereinafter described.

Referring now to FIGS. 4 to 9, the second embodiment comprises a display head 111 and a mounting arrangement 113 by which the display head is supported dependent from an overhead airframe member (not illustrated). The mounting arrangement 113 has a first part 115. Fixing means (not shown) secure the part 115 to the airframe member with the mounting face 117 of the part 115 in contact with the airframe member.

The mounting arrangement 113 includes a compliance device 121. The device 121 consists of a spring and damper unit 125 and a piston 127. The spring and damper unit 125 has a cylindrical housing within which is a zero rate spring (not visible) and a dashpot (not visible) in series therewith. The zero rate spring conveniently comprises a series of Belleville washer spring elements. Being a zero rate spring the force which it exerts is independent of its extension.

The display head 111 has a cylindrical housing 129 one end 131 of which is formed at an angle to the main body part of the housing.

Referring particularly to FIG. 8, the part 115 of the mounting arrangement 113 has a stepped opening 133 which receives a ring element 135. Screws (not shown) hold the element 135 fast to the part 115. The element 135 has a lip 139; and the inner race 141 of a rolling bearing 143 is trapped between the lip 139 and the edge of a circular collar portion 145 of the part 115.

The end 131 of the housing 129 of the display head 111 has a projecting ear portion 146. The ear 146 is connected by a pivot 147 to the free end of the piston 127. The ear 146 is fixed to the outer race 149 of the bearing 143.

The pivot axis P—P of the bearing 143 and, hence, of the display head 111 is contained in the aircraft Y-Z plane makes an angle $\theta$ of 51.5° with respect to the aircraft Z-axis (see FIG. 4). The shape of the end 131 of the housing 129 of the display head 111 dictates that when the spring and damper unit 125 is at the angular position indicated by full lines in FIG. 5, the display head 111 is at the operational position in which the longitudinal axis of the head is vertical, i.e. parallel to the Z-axis. When, by manual movement, or by accidental contact with the observer's head, the display head 111 is rotated about the axis P—P, the head moves first in a forwards direction and then sideways, i.e. first into and then in the plane of the paper in FIG. 4, as indicated by the curves I, II and III in FIGS. 5, 6 and 7. The head 111 thus moves into a stowed position, indicated by chain dotted lines in FIGS. 6 and 7. During this movement the ring member 135 rotates through an angle $\phi$ (see FIG. 5) of 130°, the spring and damper unit 125 taking up the angular position indicated by the chain dotted line in FIG. 5.

In passing to and from the operational and stowed positions, the compliance device 121 passes through its overcentre position.

As may be seen, the initial motion from the operational position has a large, (though decreasing) component in a direction away from the observer and the final motion has a large and increasing component towards the stowed position.

In this embodiment the combiner 151 (see particularly FIG. 9) comprises two glass elements 153a and 153b cemented together by an optical cement of matching refractive index. Exposed parallel faces 154a, 154b, through which the distant scene is observed, are ground and polished optically flat and parallel. The element 153b has a spherical surface 155 to which is cemented a lens 157 the surface 157a of which is made fully reflective. Adjacent to the surface 159 of the element 153a there is a field flattener lens 161.

At the interface between the elements 153a, 153b there is a thin optical film 163. Light from the screen of a cathode ray tube (not shown) housed in the cylindrical housing 129 of the display head 111 with its screen contained in the focal plane of the surface 157a passes through the field lens 161, and the film 163, and is reflected at the surface 157a to produce a collimated image incident on the film 163, the lens 157 acting to compensate for aberrations which would otherwise be present in the image. The film 163 reflects the image to the observer using the display head, so that optical data produced on the cathode ray tube screen appears as a virtual image "at infinity" to the observer, superimposed on his view of the distant scene through the combiner.

Although a solid glass construction is used in the combiner 151, it would be entirely possible to employ an open optic at this point. The film 163 could be a film on a thin glass support and the lens 157 and full reflector 157a could be a separate spherical member.

Impact absorbing padding 165 is provided on appropriate surfaces of the head to reduce the possibility of injury to the observer.

As in the first described embodiment, the maximum width of the display head 111, i.e. the horizontal dimension in FIG. 4, is made less than the interpupillary distance of the observer's eyes.

Whilst in both the above embodiments the display head is fixed in azimuth in the operational position it may be desirable in other embodiments to enable the display head position to be changed in azimuth while operational, for example, to allow for crab angle of the aircraft due to cross wind during aircraft landing manoeuvres, or for helicopter use.

One such embodiment will now be described with reference to FIGS. 10 to 14.

Referring to FIGS. 10 to 13 the display head 211 has a generally tubular part 213 which houses a cathode ray tube 215. Secured to the free end surface 217 of the part 213 there is a combiner mounting 219. A combiner 221 supported by the mounting 219 has a spherical fully reflective surface 223 and is composed of two parts 221a, 221b cemented together with an optical cement of matching refractive index and having, at their interface, a partially light-transmissive, partially light-reflective coating 224 which is deposited on one of the two parts. It will thus be seen that the combiner is essentially of the same form as that used in the second embodiment described above.

Supported by the mounting 219 between the flat face 216 of the C.R.T. 215 and the combiner 221 there is a field flattener lens 225.

The tubular part 213 is supported between two dependent cheeks 223a, 223b of a cap part 227. It is pivotal in plane bearings 227a, 227b about a pitch axis Q—Q (see FIG. 11).

For this purpose the cheeks 223a, 223b have two aligned openings, as 229. A pivot pin 231 is supported in the bearings 227a, 227b in the opening 229. The pin 231 extends through and is secured to the upper end of the tubular part 213 so that rotation of the tubular part 213 (and hence of the combiner 221) about the axis Q—Q causes rotation of the pin 231 within the bearings 227a, 227b of the cap part 227.

The cap part 227 has an upwardly projecting cylindrical boss 233. The latter portion 233 is secured to the inner races 235 of a double rolling bearing 237. The outer races 239 of the bearing 237 are secured to a toothed sector part 241. The latter part 241 has bosses (not shown) by means of which the part 241 and, hence, the entire unit 211 may be secured to an overhead member (not shown) of the crew station of the aircraft.

The overhead member is forward of the observers' seat position as indicated in FIG. 10.

An arm member 243 secured to the cap part 227 has a sleeve portion 245. A plunger 247 extends through the sleeve 245 and is biased by a spring (not shown) within the sleeve 245 towards the circular rim of the toothed sector 241.

A powerful coil spring 249 surrounds the projecting end 251 of the pin 231. One end of the spring 249 is fixed to the pin 231, being located in a hole near to its end. The other end of the spring 249 is secured to the arm 243 in like manner.

As may be seen, there are four notches 241a, b, c and d in the toothed sector 241.

Pivotally connected to the upper end of the tubular part 213 there is a catch member 253. The member 253 has an abutment portion 255 and is biased by a spring 257 in a counter-clockwise sense (FIG. 10).

When the display head is not being used it may be put into a stowed position. In this position the head is not within the visual field of the user to the distant scene through the aircraft windshield W, but extends in a generally horizontal direction with its longitudinal axis directed in a generally forwards direction obliquely to the fore and aft axis of the aircraft from the mounting position of the head 211 of the overhead member.

The stowed position is best illustrated in FIG. 12. From an operational position defined, as described more fully hereinafter, by positions X, Y and Z of the sector 241 the head 211 is rotated in azimuth in a clockwise sense (FIG. 12). For this purpose the plunger 247 must first be withdrawn, and held withdrawn, from the relevant notch 241b, c or d until the angular position of the head 211 in azimuth with respect to the sector 241 is such that the plunger 247 is able to enter (under its bias) into the stowed position notch 241a.

Having reached the latter position, manual pressure on an energy absorbing member 259 is effective to free the catch member 255 from engagement with the cheek part 223a of the cap 227. The head 211 then pivots under the bias of the spring 249 about axis Q—Q to the stowed position illustrated.

If the observer's head accidentally strikes the display head when in the operational position, the head similarly pivots to a collapsed position shown in FIG. 10, thus reducing the likelihood of injury to the observer.

In the embodiment shown any one of three discrete azimuth operational positions X, Y or Z defined by notches 241b, c and d may be chosen. The head is, of course, a monocular device to be used in the same manner as that described in the above-described embodiments. The fields of view available to the observer at each of the azimuth positions X, Y and Z are depicted in FIG. 14. The field of view is, of course, related to the alert eye position indicated in FIG. 10. As will be clear the selection of the azimuth position X, Y or Z is performed by withdrawing the plunger 247 from another notch and rotating the head to the desired azimuth position.

The provision of three discrete azimuth positions is intended to allow for a range of aircraft drift angles due to cross-winds during a landing manoeuvre for example. Associated with the two outer azimuth positions X and Z, there may be provided a micro-switch 261a, 261b. When the position Y is selected the display symbols are central within the field of view position Y (FIG. 14). If however position X or Z is chosen the symbols may be outside of the field of view or at any rate at a distance off-centre of the viewing position rendering them unsatisfactory for use. The purpose of the micro-switches 261a, 261b is to produce a deflection of the symbols presented at the face 216 of the cathode ray tube 215 so that the collimated images of those symbols are more nearly central within the field of view. More notches could of course be provided.

Ideally it would be desirable to servo the display so as to maintain the dynamic symbols of the display control within the field of view of the observer. Such an arrangement has the further virtue that being automatic, the user of the display would not have to manually adjust its position according to aircraft drift angle. It will of course be appreciated that the ideal cannot be accomplished without some degree to trade off. In particular, the provision of a servo arrangement would introduce added complexity and expense.

Finally, whilst in the embodiments described above the display head is displaceable in essentially a rotative manner between operational and stowed positions, other arrangements are possible. In particular the display head could be slidable between the stowed and operational positions. Moreover, the stowed position might be beneath the glare shield of the aircraft.

I claim:

1. A display head for an aircraft head-up display system comprising an optical projector and an image combiner through which an observer can view a distant scene and from which collimated optical images developed by and projected from the optical projector are reflected to the observer wherein: the image combiner is supported from a light obstructive member which intrudes within the observer's field of view of the distant scene in use of the display head, but no intruding part of said member has a width greater than a prescribed interpupillary distance so that notwithstanding the intrusion of said member there is no obstruction by said member of the observer's view of the distant scene, the display head being rotatable about a single axis for displacement between an operational position in which the display head is at a position intercepting the observer's line-of-sight to the distant scene and a stowed position at which the display head is at a position at which it does not intrude into the observer's field of view of the distant scene, and said single axis being inclined with respect to the aircraft orthogonal axes at such an angle, and the display head is so shaped, that in moving the display head from the operational position to the stowed position the initial movement of the display head has a major component parallel to the observer's line-of-sight to the distant scene, and the terminal movement of the display head has a major component to the left or right of said line-of-sight, in a direction at right angles to said line-of-sight towards the stowed position.

2. A display head according to claim 1 wherein said initial movement is in a direction away from the observer.

3. A display head according to claim 1 wherein the display head is connected to a member possessing compliance and the display head is pivotal about said single axis, through the overcentre position of the compliant member, between operational and the stowed positions.

* * * * *